(12) United States Patent
Hoefer et al.

(10) Patent No.: US 7,947,627 B2
(45) Date of Patent: May 24, 2011

(54) FLUID LOSS CONTROL AGENT WITH TRIGGERABLE REMOVAL MECHANISM

(75) Inventors: Ann M. W. Hoefer, Houston, TX (US); Laura Schafer, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 383 days.

(21) Appl. No.: 11/610,600

(22) Filed: Dec. 14, 2006

(65) Prior Publication Data
US 2008/0142220 A1 Jun. 19, 2008

(51) Int. Cl.
- *C09K 8/68* (2006.01)
- *C09K 8/60* (2006.01)
- *C09K 8/588* (2006.01)
- *E21B 43/00* (2006.01)
- *E21B 43/22* (2006.01)
- *C23F 11/14* (2006.01)

(52) U.S. Cl. ........ 507/203; 507/219; 507/221; 507/230; 507/244; 507/260; 166/282

(58) Field of Classification Search .................. 507/117, 507/124, 203, 219, 221, 230, 244, 260; 166/282
See application file for complete search history.

(56) References Cited

U.S. PATENT DOCUMENTS

| | | | |
|---|---|---|---|
| 3,727,689 A * | 4/1973 | Clampitt ...................... 166/283 |
| 4,986,355 A | 1/1991 | Casad | |
| 4,988,450 A | 1/1991 | Wingrave | |
| 5,035,812 A | 7/1991 | Aignesberger | |
| 5,076,373 A | 12/1991 | Hale | |
| 5,151,131 A | 9/1992 | Burkhalter | |
| 5,158,139 A | 10/1992 | Lau | |
| 5,354,786 A | 10/1994 | Lau | |
| 5,641,728 A | 6/1997 | Dobson, Jr. | |
| 5,728,210 A | 3/1998 | Moran | |
| 5,789,349 A | 8/1998 | Patel | |
| 5,850,880 A | 12/1998 | Moran | |
| 6,020,289 A | 2/2000 | Dymond | |
| 6,279,656 B1 * | 8/2001 | Sinclair et al. ................. 166/310 |
| 6,465,587 B1 | 10/2002 | Bair | |
| 6,590,050 B1 | 7/2003 | Bair | |
| 6,770,604 B2 | 8/2004 | Reddy | |
| 6,837,309 B2 | 1/2005 | Boney | |
| 6,910,537 B2 * | 6/2005 | Brown et al. ................. 166/294 |
| 6,938,693 B2 | 9/2005 | Boney | |
| 7,036,588 B2 | 5/2006 | Munoz, Jr. | |
| 7,066,260 B2 | 6/2006 | Sullivan | |
| 7,101,829 B2 | 9/2006 | Guichard | |
| 2002/0036088 A1 | 3/2002 | Todd | |
| 2003/0159625 A1 | 8/2003 | Reddy | |
| 2004/0043905 A1 | 3/2004 | Miller | |
| 2004/0094300 A1 | 5/2004 | Sullivan | |
| 2004/0129459 A1 | 7/2004 | Guichard | |
| 2005/0121194 A1 | 6/2005 | Morgan | |
| 2005/0124503 A1 | 6/2005 | Morgan | |
| 2005/0230112 A1 * | 10/2005 | Reddy et al. .................. 166/293 |
| 2005/0252659 A1 | 11/2005 | Sullivan | |
| 2006/0157248 A1 | 7/2006 | Hoefer | |
| 2006/0278389 A1 | 12/2006 | Ayoub | |

* cited by examiner

*Primary Examiner* — Timothy J. Kugel
*Assistant Examiner* — Atnaf Admasu
(74) *Attorney, Agent, or Firm* — Rachel Greene; David Cate; Jeff Griffin

(57) ABSTRACT

A fluid loss control pill or solution includes a polymer having a functional group that can be hydrolyzed by a base or a nucleophile. A method for fluid loss control in a subterranean formation includes placing a fluid loss control pill or solution in a wellbore penetrating the subterranean formation, wherein the fluid loss control pill or solution comprises a polymer having a functional group that can be hydrolyzed by a base or a nucleophile; and converting the polymer into a soluble form by hydrolyzing the functional group with a base or a nucleophile, when fluid loss control is no longer needed.

11 Claims, 1 Drawing Sheet

FLUID LOSS CONTROL AGENT WITH TRIGGERABLE REMOVAL MECHANISM

BACKGROUND OF INVENTION

The invention relates generally to well fluid loss control systems and methods. Particularly, the invention relates to fluid loss control systems that can readily be removed when no longer needed.

In oil and gas drilling and servicing, fluid loss control agents are often used to minimize the loss of drilling or service fluids (including, for example, drilling muds and fracturing fluids) into the formation and to prevent damage to the formations by the leaked fluids. For example, specialized fluid loss control agents are typically employed to control fluid loss during drilling, completion, workover and stimulation operations. These fluid loss control agents are typically designed to control fluid losses for 48 hours or more depending on the applications. In gravel pack treatments where the fluid loss control agents must prevent fluid losses in high permeability formations for periods of 48 hours or more, such fluid loss control agents are referred to as kill pills or kill fluids. However, depending on the types of reagents used, these reagents themselves may be damaging to the formations if allowed to remain in the formations. Therefore, when the fluid loss control is no longer needed, these fluid loss control agents would have to be removed so that they do not damage the formations.

Providing effective fluid loss control without damaging formation permeability in completion operations has been a prime requirement for an ideal fluid loss control agent. Conventional fluid loss control agents include oil-soluble resins, calcium carbonate, and graded salt fluid loss additives. These agents achieve their fluid loss control by having solids or particulates that form a filter-cake on the face of the formation to inhibit flow into and through the formation. However, these additive materials can cause severe damage to near-wellbore areas after their application. This damage can significantly reduce production levels if the formation permeability is not restored. In addition, these conventional fluid loss additives require long periods of clean up after their use, often by fluid circulation.

In addition to the particulate fluid loss control agents mentioned above, conventional gel agents such as viscoelastic surfactants and linear or metal-crosslinked polymers have also been used in controlling fluid loss. Hydroxyethylcelluloses (HEC) and various guars or modified guars are among the most commonly used polymers in fluid loss control agents. Normally, these polymers do not form rigid gels, but they can be made viscous by crosslinking with borate, zirconium, or other suitable metal ions. Examples of fluid control using such polymers can be found, for example, in M. E. Blauch et al., SPE 19752, "Fluid Loss Control Using Crosslinkable HEC in High-Permeability Offshore Flexure Trend Completions," pages 465-476 (1989); U.S. Pat. No. 4,552,215, issued to Almond et al., SPE 29525, "A New Environmentally Safe Crosslinked Polymer for Fluid Loss Control," pages 743-753 (1995), by R. C. Cole et al.; SPE 36676, "Development and Field Application of a New Fluid Loss Control Material," pages 933-941 (1996), by P. D. Nguyen et al.; and U.S. Pat. No. 5,372,732, issued to Harris et al.

When these cross-linkable polymers (e.g., HEC or guars) are used as fluid loss control agents, they need to be removed after application to avoid damage to the formation. These agents are typically removed by circulating an external breaker, such as an acid. In addition to acids, U.S. Pat. No. 6,818,594, issued to Freeman et al., discloses the use of encapsulated enzymes to degrade such polymers. However, enzymes have limited use as breakers due to downhole temperature and pH restrictions.

While these conventional fluid loss control agents are useful, they may suffer from one or more of the following drawbacks: 1) Fluid loss control agents may lose efficiency over time, requiring the placement of additional control agents; 2) Removal of the fluid loss control agent often relies on circulating an external breaker, such as an acid; and 3) Fluid loss control agents may be damaging to the formation, especially if they are not completely removed.

When relying on circulating an external breaker to remove the fluid loss control agents, other issues may arise with the conventional fluid control technology, such as unreliable break times and complexity. While the conventional fluid loss control systems are sufficient for the purpose, there still exists a need for better fluid loss control systems. Ideally, good fluid loss control agents are stable for the durations needed under the downhole conditions and can be easily removed, preferably without the need to circulate an external breaker. In the case of kill pills, most preferably, it should be possible to remove fluid loss control systems on demand, so that there is no danger either of carrying out subsequent treatment too soon or of unnecessary waiting for the pill to break.

SUMMARY OF INVENTION

In one aspect, the present invention relates to fluid loss control pills or solutions. A fluid loss control pill or solution in accordance with one embodiment of the invention includes a polymer having a functional group that can be hydrolyzed by a base or a nucleophile.

In another aspect, the present invention relates to methods for fluid loss control in a subterranean formation. A method in accordance with one embodiment of the invention includes placing a fluid loss control pill or solution in a wellbore penetrating the subterranean formation, wherein the fluid loss control pill or solution comprises a polymer having a functional group that can be hydrolyzed by a base or a nucleophile, and converting the polymer into a soluble form by hydrolyzing the functional group with a base or a nucleophile, when fluid loss control is no longer needed.

Other aspects and advantages of the invention will be apparent from the following description and the appended claims.

DETAILED DESCRIPTION

Figure 1:
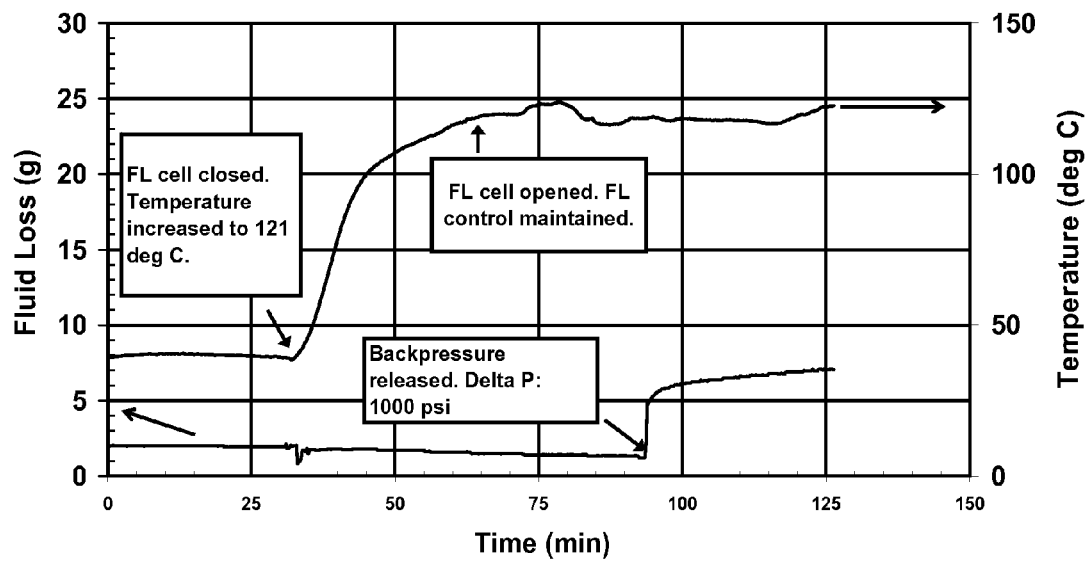
FIG. 1 shows results from fluid loss control experiments using a modified latex.

Embodiments of the invention relate to fluid loss control systems and methods. A fluid loss control system in accordance with embodiments of the invention uses a fluid loss control agent that has different solubilities depending on the conditions of the medium. That is, the solubility of fluid loss control agents of the invention can be readily manipulated such that they can be made soluble when fluid loss control is no longer needed. Because these fluid loss control agents can be readily converted to soluble forms and removed, they are less likely to damage the formation.

In accordance with embodiments of the invention, a fluid loss control agent may be a polymer having a functional group that can be chemically converted into a different type of functional group such that the solubility of the polymer is substantially changed. The functional groups that are useful in this regard, for example, may include hydrolyzable functional groups such as anhydrides, lactones, esters, imides, lactams, and the like. Note that the anhydrides, lactones and esters include thioanhydrides, thiolactones and thioesters. A common property of these functional groups is that they can be readily hydrolyzed by a base (e.g., $OH^-$) or a nucleophile (e.g., ammonia, a hydroxylamine, or an amine $R-NH_2$). A base may be any base commonly known in the art, such as sodium hydroxide, potassium hydroxide, lithium hydroxide, or the like. When a base is added to or generated in a solution, the pH of the solution is raised. Thus, adding or generating a base may be referred to as raising the pH of a solution.

In this description, "hydrolyze" or "hydrolysis" is used in a broad sense to include hydrolysis by a base or conversion by a nucleophile. Once hydrolyzed, the polymer substituted with the resultant functional groups, such as carboxylic acids, alcohols, amides, and amines, are more soluble in an aqueous medium, and, therefore, the fluid loss control agent will become soluble in the well fluids and can be readily removed.

In accordance with embodiments of the invention, the fluid loss control agents are polymer based. Suitable polymers, for example, may include polyvinyl alcohols (PVOH), polyamides, polyesters, polyolefin, latexes, and the like. These polymers are commonly used in the art, and their preparations and uses are known to one of skill in the art. Using latex as an example, the following briefly describes its preparation and uses. As used herein, the terms latex resin, latex, or latex polymer refer to a dispersion of a water inert polymer which may be prepared by polymerization techniques, for example, by emulsion polymerization, and further, includes polymers prepared by these techniques where the average diameter of the dispersed polymer ranges from the nano scale, such as nanolatexes, to microgels which are on the order of from about $10^{-3}$ microns to about $10^3$ microns in diameter, including any functional diameter therebetween. The latex polymer may be an aqueous emulsion of finely divided polymer particles. Any practical blend of latex size may be used in accordance with the invention, such as a blend of a latex polymer and a nanolatex polymer. For purposes of this disclosure, the terms latexes and "lattices" have the same meaning.

Latex polymers are prepared synthetically by polymerizing monomers that have been emulsified with surfactants. For example, in preparing a latex by emulsion polymerization, typically a surfactant is dissolved in water until a critical micelle concentration (CMC) is reached. The interior of the micelle provides the site necessary for polymerization. In some preparations, a monomer (e.g., styrene, hydroxylethyl acrylate, methyl methacrylate, and the like) and a water-soluble free radical initiator are added and the whole batch is mixed to form the polymer.

Core-shell latexes are also useful in some embodiments of the invention. Readily known to those of skill in the art, preparation of core-shell latexes is commonly performed by two-stage emulsion. In the first stage, a water inert polymer is formed as the core by emulsion polymerization. In a second stage, polymerization of a shell surrounding the core is prepared by emulsion polymerization. Typically, latex resins (polymers) are stabilized in the aqueous environment by surfactants, by functionality of the shell in a core-shell latex, or by a combination of surfactant and functionality of the shell.

Non-limiting examples of latex types, which may be useful, include latexes of acrylic copolymers, methacrylic copolymers, polyvinyl alcohol, polyvinyl acetate, polyvinyl esters such as vinyl versatic acid, crosslinked polyvinyl alcohol, vinyl acetate, polyvinyl pyrrolidone, and the like. Any suitable latex may be used according to embodiments of the invention.

When incorporated as a water inert polymer, the latex polymer amount may vary from about 0.1% to about 50% by weight, based upon total fluid weight, The lower limit of the latex amount being no less than about 0.1, 0.5, 1, 2, 3, 4, 5, 6, 7, 8, 9, 10, or 15% by weight, based upon total fluid weight, and the upper limit being no greater than 50, 45, 40, 35, 30, 25, 24, 23, 22, 21, or 20% by weight, based upon total fluid weight. Preferably, the latex is incorporated in an amount from about 1% to about 20% by weight, based upon total fluid weight, more preferably from about 5% to about 15% by weight, based upon total fluid weight. Note that similar concentrations described herein may also be used with other polymers, including polyvinyl alcohols (PVOH), polyamides, polyesters, polyolefins, and the like. Alternatively, one of ordinary skill in the art would know how to choose a suitable concentration for the particular polymer to confer the desired properties in a particular application.

These fluid loss control agents, in their insoluble form, may form waxy solids or particulates in a fluid loss control fluid (or oilfield service fluid), or they may form viscous fluids. The waxy solids or particulate suspension or viscous fluids formed by a fluid loss control agent of the invention may be used to seal the formations when fluid loss control is desired, such as immediately after perforation and until gravel pack treatment, during drilling or during fracturing treatment. One of ordinary skill in the art would appreciate that these fluids may be prepared on-site before use, or they may be pre-formulated off-site.

A fluid loss control agent of the invention may be used, pumped, and placed in a manner similar to the conventional fluid control pills, using any suitable techniques known in the art, such as using PURE® perforation technology. PURE®, a Schlumberger trade name for a technique/method of perforating, is described in U.S. patent publication No. 2002/0020535A1, which is assigned to the present assignee and incorporated by reference in its entirety. In PURE® perforation, the casing is perforated while the well is overbalanced (i.e., wellbore pressure is greater than formation pressure). Immediately after perforation the well goes underbalanced (i.e., wellbore pressure is less than formation pressure). This underbalanced causes a surge of pressure flow from the formation through the perforation tunnel and aids in cleaning debris from the perforation tunnel. Then, the wellbore goes back just slightly overbalance. This entire process takes place very rapidly, in less than 1 second. PURE® technology results in cleaner perforations than traditional overbalanced perforating methods.

Fluid loss control agents may be prepared in any form conventionally used in the art. For example, these agents may be prepared in solid, powder, or granule form ready to be formulated before use, and they may be prepared in pre-weighed dosage for convenient use. Alternatively, these agents may be prepared as highly viscous fluids, referred to as "fluid loss control pills" or "kill pills." Pills are typically employed in high permeability formations (i.e., greater than 10 mD or as high as 2 D). These fluid loss control pills may be made into a solution or suspension before use, or they may be added to the well fluids in a wellbore to form the fluid loss control fluid in situ. Alternatively, these agents may be pre-formulated into a solution (or suspension) ready to use. Note that fluid loss control agents of the invention may be used as a kill pill or mixed in with other treatment fluids such as fracturing or drilling fluids.

In fluid loss control, the particle size of the polymer may require proper sizing based on the pore throat diameters of the formation rock. In accordance with embodiments of the invention, particles of the fluid loss control agents are placed for example in the perforations, providing fluid loss control. Therefore, it is preferred that the particle size distribution of the agents overlaps the pore sizes expected to be encountered in the formation.

Although there is no universal agreement on the precise relationship between particle sizes and pore dimensions, the following guidelines may be used. These guidelines are disclosed in U.S. Patent Application Publication No. 2006/0157248 A1, which is assigned to the present assignee and incorporated by reference in its entirety. Particles having diameters greater than about one-third (although some researchers say up to one half) of a pore throat diameter are expected to bridge at or near the formation face. Particles smaller than that but larger than about one-seventh of a pore throat diameter are expected to enter the formation and be trapped and form an internal filter cake. Particles smaller than about one-seventh of a pore throat diameter are expected to pass through the formation without substantially affecting flow. It is to be understood that there are other important factors such as distributions of particle and pore sizes, flow rate, particle concentration, and particle shape.

When the fluid loss control system is used to control leak off, the optimal concentrations of the fluid loss control agents in the particular fluid system are determined by choosing the desired leak-off parameters and measuring leak-off with samples of the intended fluids and of the formation or of a rock similar to the formation. Leak-off is defined by three terms: "spurt", which is the initial rapid leak-off of fluid before a filter cake barrier is formed on the fracture face and is measured in L/square meter (or gallons/100 square feet), and, for the subsequent leak-off that occurs even after a filter cake is formed and is governed by the viscosity and the wall-building propensity: Cw, the wall-building fluid loss coefficient, and Cv, the viscosity controlled fluid loss coefficient. Cw is not applicable where there is no wall-building material present. Cv is not applicable where there is a low, finite Cw. Cw and Cv are measured in $mm/min^{1/2}$ ($ft/min^{1/2}$). Preferred, more preferred and most preferred values of spurt, Cw and Cv are as follows:

| Embodiment | Spurt, L/m2 (gal/100 ft2) | Cw, $mm/min^{1/2}$ ($ft/min^{1/2}$) | Cv, $mm/min^{1/2}$ ($ft/min^{1/2}$) |
|---|---|---|---|
| Preferred | 0 to about 2 (0 to about 5) | about 0.3 to about 15 (about 0.001 to about 0.05) | about 0.3 to about 15 (about 0.001 to about 0.05) |
| More preferred | 0 to about 0.8 (0 to about 2) | about 0.3 to about 2.4 (about 0.001 to about 0.008) | about 0.3 to about 2.4 (about 0.001 to about 0.008) |
| Most preferred | 0 to about 0.4 (0 to about 1) | about 0.3 to about 0.9 (about 0.001 to about 0.003) | about 0.3 to about 0.9 (about 0.001 to about 0.003) |

The values of these parameters (and the actual behavior they represent) may vary significantly provided that a suitable filter cake is produced in an appropriate time. A test method for determining these values is given in Navarrete et al., "Dynamic Fluid Loss in Hydraulic Fracturing Under Realistic Shear Conditions in High-Permeability Rocks," SPE Production and Facilities, pp 138-143 (August, 1996).

In accordance with one embodiment of the invention, removal of the fluid loss control agent or pill would be on demand, by changing the pH or by addition or generation of a nucleophile to the wellbore fluid in contact with the fluid loss additive. For example, in the case of gravel pack treatments, the pH of the gravel pack fluids may be increased high enough to open a lactone ring along a polymer backbone or to hydrolyze an ester in order to solubilize the particles. Alternatively, a nucleophile may be used to achieve the same aim. Thus, the removal of the fluid loss control agent would take place "on demand", for example upon contact with the gravel pack fluid. In addition to adding a base or nucleophile directly to the fluid, a foam stick containing a base (e.g., sodium hydroxide) or a nucleophile (e.g., an amine) may be dropped downhole to trigger solubilization of the polymer. In another scenario, a chamber or a container (e.g., canister) filled with a base or a nucleophile may be disposed on a downhole tool or a tubing (e.g., a washpipe) and placed in the treatment zone. The container (e.g., canister) may be used to release base or nucleophile to break the fluid loss control agent, for example by sending a command from the surface. An example of a suitable canister is disclosed in a U.S. patent application, entitled "Chemical Deployment Canisters for Downhole Use," by Prado et al., filed on the same filing date as the present application. Similarly, shunt tubes attached to the sand control screens may be packed with a base or a nucleophile that may be released upon command to solubilize the fluid loss control agent (kill pill).

The following describes several examples to illustrate embodiments of the invention. These examples are for illustrative purpose only. One of ordinary skill in the art would appreciate that these examples are not exhaustive and they are not intended to limit the scope of the invention. It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Example 1

In the first example, the fluid loss control agent was ISOBAM 600® a polymer of the ISOBAM® line of products manufactured by Kuraray Co., Ltd. (Tokyo, Japan). ISOBAM® 600 is a low molecular weight co-polymer of isobutylene with maleic anhydride. It is obtained as a dry white powder sold in a size ranging from about US mesh (ASTM) 40 down to less than 400. This polymer is insoluble in water under acidic or neutral conditions. However, the polymer becomes water soluble in the presence of a base or a nucleophile because the anhydride groups can be readily opened up by the base or the nucleophile. This feature makes it a desirable fluid loss control agent because it has a triggerable mechanism that can be used to remove the fluid loss control agents from the wellbore when fluid loss control is no longer required. Other ISOBAM® products may also be used.

ISOBAM 600® is stable and remains as solids for at least 48 hours at 175° F. (79.4° C.) in deionized water. An experiments were conducted at 175° F. (79.4° C.) with 1 g ISOBAM 600® in 99 mL deionized water having the pH adjusted with sodium hydroxide to 3, 5, 7, 9, 11, and 13 in 125 mL glass jars. The ISOBAM® powder sank to the bottom of the glass jars and turned the solutions opaque white. The ISOBAM® 600 dissolved completely to a clear solution in 15 minutes in the pH 13 de-ionized water, whereas the ISOBAM® 600 remained solid and unchanged in the de-ionized water solutions with pH 3, 5, 7, 9, and 11. ISOBAM 600® is solubilized in the pH 13 de-ionized water due to the opening of the anhydride ring on the polymer.

However, after cooling, it dissolves at room temperature in less than 1 minute upon increasing pH to about 12 or higher. 1 g of ISOBAM® 600 was added to 99 mL of de-ionized water having the pH adjusted to 5, 7, and 9 in glass jars. The ISOBAM® 600 powder remained solid and turned the solutions opaque white. The ISOBAM® 600 initially floated on top of the water, because it is less dense than water. The samples were heated to 175° F. (79.4° C.) for 48 hours and cooled to 170° F. (21.1° C.). The ISOBAM® 600 had sunk to the bottom of the jars during heating, but still remained solid and made the solutions opaque white, but to a lesser degree than what had been initially observed. The ISOBAM® 600 dissolved to a clear solution in less than 1 minute upon raising the pH of each sample to greater then 12 regardless of the initial pH (5, 7, or 9) of the sample.

Similar results were obtained for ISOBAM® 600 in 2% KCl. However, the time needed to solubilize this polymer in 2% KCl increased to 45 minutes at 175° F. (79.4° C.). 1 g of ISOBAM® 600 was added to glass jars containing 99 mL of 2% potassium chloride (KCl) prepared from de-ionized water. The ISOBAM® 600 powder remained solid and turned the solution opaque white. The ISOBAM® 600 initially floated on top of the 2% KCl solutions as it is less dense than 2% KCl. The pH of the 2% KCl solutions was adjusted to 5, 7, or 9 prior to the addition of the ISOBAM® 600. The 3 samples were heated to 175° F. (79.4° C.) for 48 hours. The ISOBAM® 600 agglomerated during heating, with some ISOBAM® 600 floating on top of the 2% KCl solution and some falling to the bottom of the jars. The solutions were cooled to 70° F. (21.1° C.). The ISOBAM® 600 dissolved to a clear solution in less than 1 minute upon raising the pH of each sample to greater then 12, regardless of the initial pH (pH 5, 7, or 9) of the sample. Even though the rate of hydrolysis was slower in the presence of 2% KCl, it was not too slow to be useful under downhole conditions.

Example 2

The second example used a polyvinyl alcohol (PVOH) based polymer, i.e., a modified PVOH. PVOH is typically prepared by polymerizing vinyl acetate, followed by hydrolysis of the acetate groups. The hydrolysis step can be controlled to occur to a desired extent (e.g., 70%, 80%, or 90% hydrolysis) such that the PVOH has a desired property. For use as a fluid loss control agent, a modified PVOH is insoluble in an aqueous medium. That is, such modified PVOH have sufficient ester functional groups remaining, and the remaining ester groups are hydrolyzable by a base or a nucleophile. Other modified PVOH may include copolymers of PVOH and another ester, such as methyl methacrylate. Examples of such modified PVOH polymers are described in U.S. Pat. No. 5,137,969, issued to Marten et al. (Col. 5, lines 1-11). This patent is hereby incorporated by reference in its entirety. Some of these modified PVOH are sold by Celanese Chemicals (Dallas, Tex., U.S.A.) under the trade name of VYTEK™. In addition, POVH may also be modified to include functional groups, such as carboxylic acid, thiol, paraffin, silane, sulfuric acid, acetoacetylate, polyethylene oxide, quaternary amine, or other functional groups. Examples of such modified POVH may be found in U.S. Patent Application Publication No. 2006/0157248 A1. This patent application is assigned to the same assignee as the present application and is hereby incorporated by reference in its entirety. These polymers may be insoluble due to the presence of the ester groups. However, they are readily soluble in water-based media when these esters are hydrolyzed, by addition of a base (e.g., NaOH) or a nucleophile (e.g., $NH_2OH$). These modified PVOH, being relatively more soluble in water, may not have the long term stability demonstrated by ISOBAM 600®. However, they are still useful as a fluid loss control agent because they can readily be converted into a soluble form—i.e., they can be removed on demand.

Example 3

The fluid loss control agent used in this example was a low-viscosity latex, such as those supplied by Hexion Specialty Chemicals (Columbus, Ohio, U.S.A.). Latex can be made synthetically by polymerizing a monomer that has been emulsified with surfactants. For example, U.S. Pat. No. 5,175,205 discloses the preparation of low viscosity latex. This patent is hereby incorporated by reference in its entirety. The latex disclosed in this patent is synthesized from copolymerizable monomers having at least one terminal alkene ($CH_2$=C<) group. Such monomers are preferably alkyl esters of acrylic or methacrylic acid, and the latex may be synthesized from one monomer or from combinations of monomers. After polymerization, the ester groups are hydrolyzed to give carboxylated polymers, which are low viscosity latex.

The hydrolysis of the esters is controlled to any desired extent (e.g., 50%, 70%, or 90%), as described above for modified PVOH. If a substantial percentage of the esters remains, the polymer will have low solubility in an aqueous medium. On the other hand, when most of the ester groups are hydrolyzed, the low viscosity latex will have enhanced solubility in an aqueous medium. This property is used to make desirable fluid loss control agents in accordance with embodiments of the invention.

Bench top evaluations were made of a low viscosity, modified latex having some ester groups remaining. This latex was insoluble in an aqueous solution at low pH, even when the temperature was increased to 200° F. (93.3° C.). 0.9 mL latex (Rhodia DV8100) (Rhodia, Inc. Cranbury, N.J., U.S.A.) was added to 125 mL glass jars containing 99 mL of de-ionized water adjusted to pH's of 3, 5, 7, 9, 11, and 13 with sodium hydroxide. The de-ionized water became milky white upon the addition of the latex. The latex dissolved completely to a clear solution at 70° F. (21.1° C.) in 25 minutes in the pH 13 de-ionized water, whereas the latex remained solid and the solutions milky white and unchanged in the de-ionized water solutions adjusted to pH's of 3, 5, 7, 9, and 11. All samples (pH 3, 5, 7, 9, 11, and 13) were heated to 200° F. (93.3° C.). The latex in the pH 13 de-ionized water remained dissolved (clear) and the samples at pH's of 3, 5, 7, 9, and 11 remained unchanged. The samples were cooled to 70° F. (21.1° C.). The pH's of the pH 5, 7, 9, 11, and 13 samples were found to have been reduced to 3.1, 3.2, 3.4, 5.4 and 12.7 respectively, due to the low pH of the latex, and the latex remained stable under this condition.

Stability tests in water were conducted for 48 hours at 175° F. (79.4° C.) with the same latex (Rhodia DV8100) (Rhodia, Inc. Cranbury, N.J., U.S.A.) as used before. 0.9 mL latex was added to glass jars containing 99 mL of de-ionized water adjusted to pH's of 5, 7, and 9 with sodium hydroxide. The de-ionized water became milky white upon the addition of the latex. The samples were heated to 175° F. (79.4° C.) for 48 hours and then cooled to 70° F. (21.1° C.). The latex remained unchanged during the heating interval. The samples were cooled to 70° F. (21.1° C.) with no change. The latex dissolved completely to a clear solution upon increasing the pH to 6.8 with sodium hydroxide. However, recall that this latex had become soluble at room temperature when placed into water that had been adjusted to pH 13 with NaOH (see above).

FIG. 1 shows complete fluid loss control using 30 vol % of this latex in a 0.64 mD core. The temperature was maintained at 100° F. (38° C.) with a differential pressure of 800 psi during the first 30 minutes of the test. Then, the temperature was increased to 250° F. (121° C.). To prevent fluid loss, the fluid loss cell was closed during the time period required to heat the cell to 250° F. (121° C.). The cell was re-opened at 65 minutes; no fluid was lost through the latex seal. Ninety-five minutes into the test, the backpressure was released, and fluid loss increased slightly, but immediately slowed to an acceptable rate.

The above examples clearly show that a polymer having readily hydrolyzable functional groups may be used as a fluid loss control agent, in accordance with embodiments of the invention. Such fluid loss control agents can readily be converted (hydrolyzed) into a water soluble agent so that they can be removed on demand.

Figure 2:
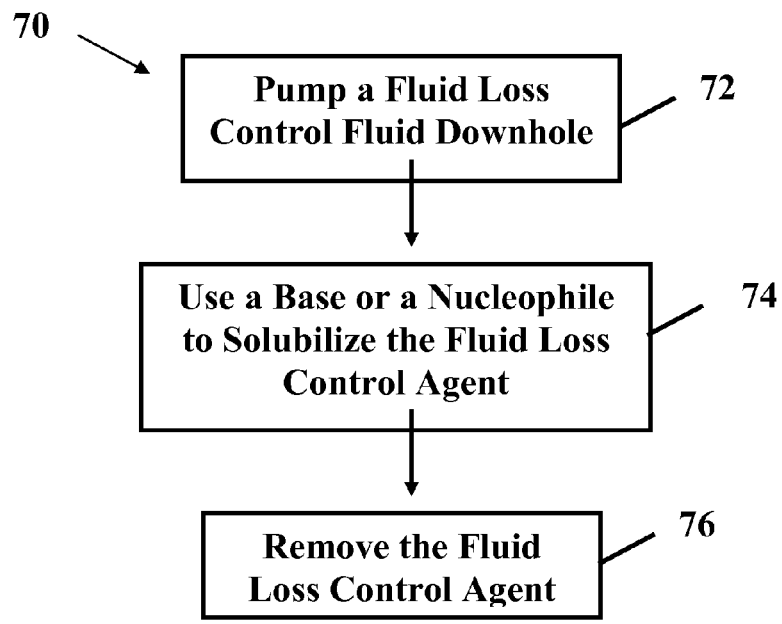
FIG. 2 shows a flow chart of a method for fluid loss control in accordance with one embodiment of the invention.

FIG. 2 shows a flow chart illustrating a method of fluid loss control in accordance with one embodiment of the invention. A method 70 for fluid loss control includes placing a fluid loss control agent of the invention in a wellbore when fluid loss control is needed (step 72). The fluid loss control agent is typically prepared as a fluid either on site or pre-formulated. The fluid loss control fluid is allowed to remain in formations for the duration needed to perform a well treatment (e.g., for a kill pill, this timeframe may be 24-72 hours; for fracturing treatments, the timeframe may be several hours or less). When the fluid loss control is no longer needed, a base or a nucleophile is used to convert the fluid loss control agent into a water-soluble form (step 74). Thereafter, the "solubilized" fluid loss control agent may optionally be removed by circulating a fluid downhole, or the fluid loss control agent may be removed during production (step 76). Alternatively, steps 74 and 76 may be performed in a single step. For example, a production fluid may have a high enough pH to solubilize the fluid loss control agent. Therefore, the hydrolysable group (e.g., esters on PVOH) may be hydrolyzed in the presence of water and the high temperatures downhole.

Embodiments of the invention may have one or more of the following advantages. A fluid loss control agent of the invention can be readily removed when fluid loss control is no longer needed. Therefore, they are less likely to damage the formation. Removal of fluid loss control agents can be readily achieved by adding a base or a nucleophile. There is no need to circulate a breaker downhole. A fluid loss control agent of the invention can be used in the manner of a conventional fluid loss control agent; no special equipment or setup is needed.

When used with a downhole container (e.g., a canister) to release a base or a nucleophile, removal of the fluid loss control agent may be "on demand" from a pressure pulse (or other signal) from the surface. If a basic gravel pack fluid is pumped to dissolve the pill or fluid loss control agent, the acid flush step in a gravel packing operation becomes unnecessary. When using embodiments of the invention for fluid loss control in fracturing fluids, a base (or a nucleophile) may be pumped to remove the pill or an encapsulated base (or an encapsulated nucleophile), (which would release the base or nucleophile upon fracture closure or upon dissolution of the encapsulation material, thereby dissolving the fluid loss control agent, may be pumped with the fluid loss control agent. With these methods, a step in the operation may be omitted, thereby decreasing rig time/operational costs on surface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for fluid loss control in a subterranean formation, comprising:
   placing a fluid loss control pill or solution in a wellbore penetrating the subterranean formation, wherein the fluid loss control pill or solution comprises a polymer having a functional group that can be hydrolyzed by a base or a nucleophile; and
   converting the polymer into a soluble form by hydrolyzing the functional group with the base or the nucleophile, when fluid loss control is no longer needed.

2. The method of claim 1, further comprising removing the solubilized polymer from the wellbore.

3. The method of claim 1, wherein the functional group is one selected from the group consisting of a lactone, an ester, a thiolactone, a thioester, a lactam, and an imide.

4. The method of claim 1, wherein the polymer is a copolymer of isobutene and maleic anhydride.

5. The method of claim 1, wherein the polymer is a latex.

6. The method of claim 1, wherein the polymer is a polyvinyl alcohol based polymer.

7. The method of claim 1, wherein the base or the nucleophile is delivered downhole in a canister.

8. The method of claim 1, wherein the base or the nucleophile is delivered downhole by dropping a solid stick or ball downhole.

9. The method of claim 1, wherein the base or the nucleophile is delivered downhole through a subsequent treatment fluid.

10. The method of claim 1, wherein the base or the nucleophile is delivered downhole by circulation.

11. The method of claim 1, wherein the base or the nucleophile is delivered downhole by encapsulated base or nucleophile.

* * * * *